United States Patent

[11] 3,628,256

| [72] | Inventor | Roger W. Story<br>26 Hill St., Alplhaus, N.Y. 12008 |
|---|---|---|
| [21] | Appl. No. | 22,551 |
| [22] | Filed | Mar. 25, 1970 |
| [45] | Patented | Dec. 21, 1971 |

[54] AIRCRAFT NAVIGATION TEACHING DEVICE
2 Claims, 3 Drawing Figs.

[52] U.S. Cl........................................................ 35/10.2,
46/45, 46/239
[51] Int. Cl........................................................ G09b 9/08,
G09b 9/16
[50] Field of Search........................................... 35/10.2, 45;
46/45, 234, 235, 238, 239

[56] References Cited
UNITED STATES PATENTS
3,136,544  6/1964  Strayer........................ 46/239 X 3,507,969  4/1970  Greenwade.................. 35/10.2
FOREIGN PATENTS
117,322  4/1957  U.S.S.R. ....................... 35/10.2

*Primary Examiner*—Eugene G. Botz
*Assistant Examiner*—R. Stephen Dildine, Jr.

ABSTRACT: A device for demonstrating and teaching the principles of aircraft radio navigation with reference to an omnirange station in which movement of a model aircraft on a surface representing the geographical area around an omnirange station is followed by a position sensing system. The position sensing system incorporates a course selector dial and indicators similar to those generally provided in an aircraft omnirange navigation system. Manipulation of the model aircraft and the course selector dial results in indicator displays which are consistent in nature and sense with those which would be observed in actual aircraft radio navigation.

PATENTED DEC 21 1971

3,628,256

AC SUPPLY AND
REFERENCE VOLTAGE

INVENTOR

Roger W. Story

AIRCRAFT NAVIGATION TEACHING DEVICE

BACKGROUND OF THE INVENTION

The field of invention is teaching devices and particularly as related to devices for teaching aircraft radio navigation with reference to an omnirange station (also known as a VOR).

Various types of teaching devices have been used to teach omnirange navigation both preliminary to and as an adjunct to in-flight training. The types of devices which have been used can, in general, be grouped into two categories, i.e., relatively simple static displays and relatively complicated flight simulators. A disadvantage of the static displays is the fact that they are static and therefore require that the student visualize a great deal. Flight simulators are relatively complex because in addition to providing a dynamic simulation of the system of navigation they incorporate flight controls. Their complexity has tended to limit their use and they have the disadvantage that they can serve only one student at a time.

The present invention is intermediate between these two extremes in that it provides a dynamic simulation of this method of navigation without introducing the added complexity of flight control.

SUMMARY OF THE INVENTION

In this invention, one surface of a sheet of nonmagnetic material represents the geographical area around an imaginary omnirange station. This surface is marked to show the location of the omnirange station and magnetic directions. A moveable piece representing an aircraft is provided and is intended to be moved about manually on the surface. A pivoted radial arm, located on the opposite side of the surface, follows the movement of the piece by means of magnetic force. The radial arm is connected to a position sensing system which comprises three selsyn units (also known as synchros or autosyns) and two discrimination circuits. A course selector dial is also connected to the position sensing system. The function of this system is to cause a "to-from" indicator and a course deviation meter which are connected to the system to respond to changes in the position of the moveable piece and the course selector dial in such a way that real conditions of aircraft navigation are simulated. The course selector dial, the "to-from" indicator and the course deviation meter are mounted on a small instrument panel and are equivalent to the type of equipment generally provided in the aircraft in an omnirange navigation system.

The object of this invention is to provide a dynamic simulation of aircraft navigation with reference to an omnirange station for the purpose of demonstrating and teaching the principles of this method of navigation.

DESCRIPTION OF THE PREFERRED EMBODIMENTS

Figure 1:
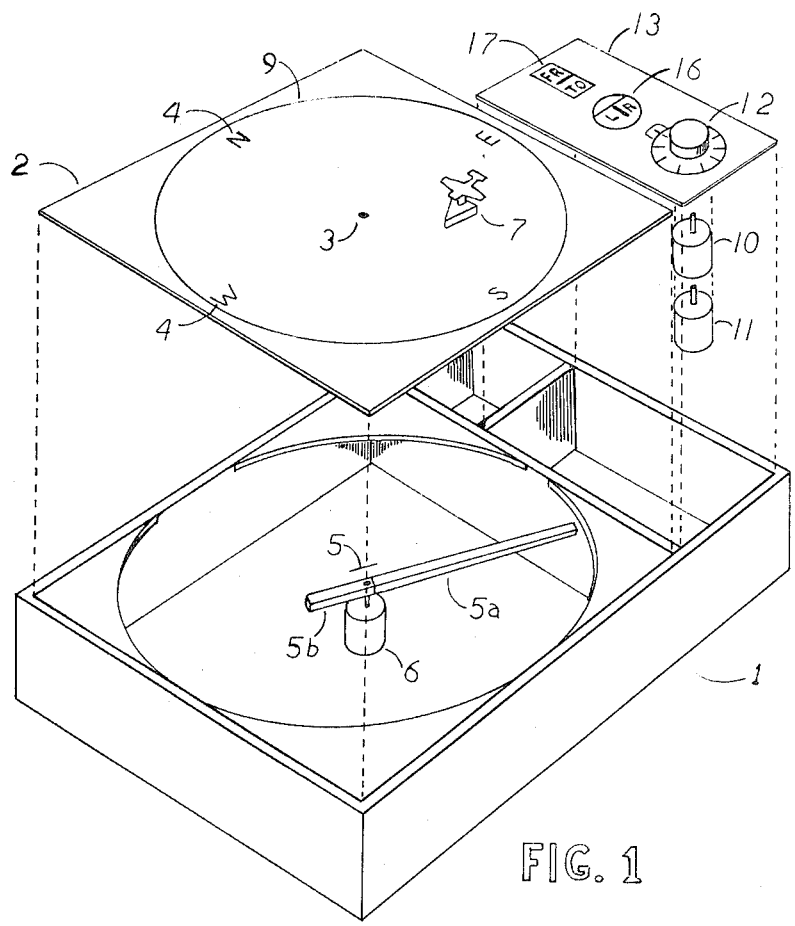
FIG. 1 is an exploded view in perspective of the preferred form of the device.

Referring to FIG. 1, the device is preferably housed in a case 1 made of a suitable structural material such as wood, metal or plastic. Though not illustrated, the case 1 may be fitted with a cover and common case hardware such as latches, hinges and handles.

A sheet of nonmagnetic material 2 such as glass or plastic is mounted in and is supported by the case 1. This sheet 2 is marked to show the location of a simulated omnirange station 3 and the compass directions 4. These markings 3, 4, which are intended to be viewed from above, are preferably on the lower surface of the sheet 2, the sheet 2 being transparent. Alternatively, the markings 3, 4 may be on the upper surface. More elaborate markings such as additional compass directions and representations of geographical features may be applied to the surface or an overlay incorporating such additional markings may be placed on the surface.

A radial arm 5 is mounted on and secured to the shaft of a selsyn 6 of the type commonly used for remote positioning and indication (also known as synchros). The selsyn 6 is mounted in the case 1 beneath the nonmagnetic surface 2 in such a position that the selsyn 6 shaft axis is in line with the simulated omnirange station marking 3. A section of the radial arm 5a on one side of the selsyn 6 shaft axis is made of a magnetic material such as soft iron. Another section of the radial arm 5b including the mounting point and extending on the opposite side of the selsyn 6 shaft axis is made of nonmagnetic material such as aluminum or brass. The purpose of the nonmagnetic section 5b is to balance the weight of the magnetic section 5a so that there is no resultant moment about the selsyn 6 shaft axis due to weight. The reason for this portion of the radial arm 5b being nonmagnetic will be apparent from a description of the operation of the device.

Figure 2:
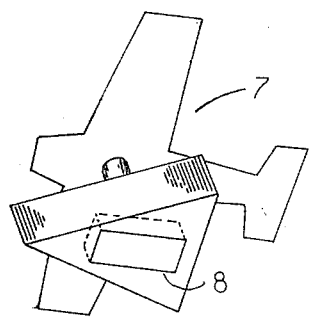
FIG. 2 is a view of the piece representing an aircraft.

Referring to FIG. 2, a moveable piece 7 preferably in the form of a model aircraft is provided. Preferably one or more permanent magnets 8 are attached to the piece 7 or, if desired, an electromagnet may be used. In the operation of the device, the moveable piece 7 is placed on the nonmagnetic surface 2 and is initially moved in a circle around the simulated omnirange station 3 to establish magnetic attraction between the piece 7 and the radial arm 5. Thereafter, the radial arm 5, being free to swing, will follow the movement of the piece 7 so long as the piece 7 is not lifted from the surface 2 or moved outside of a circle 9 which is marked on the surface 2 to show the limit of the area covered by the radial arm 5. Because only one section of the radial arm 5a on one side of the selsyn 6 shaft axis is made of magnetic material, movement of the piece 7 directly over the simulated omnirange station 3 from one side to the opposite side will cause the radial arm 5 to swing to the opposite side and continue to follow movement of the piece 7. Thus the angular position of the radial arm 5 with respect to the selsyn 6 shaft axis is always the same as that of the piece 7 with respect to the simulated omnirange station 3.

As already noted, in the preferred form of the device one section of the radial arm 5a is made of magnetic material and a permanent magnet(s) is attached to the moveable piece 7. The same object, namely magnetic attraction between the radial arm 5 and the moveable piece 7, may also be attained by attaching the magnet(s) to the radial arm 5 and attaching magnetic material to the moveable piece 7 or, alternatively, by attaching magnets to both the radial arm 5 and the piece 7.

The selsyn 6 which is connected to the radial arm 5 is electrically interconnected with two other selsyns 10, 11. The shafts of the latter two selsyns 10, 11 are mechanically connected to a course selector dial 12 which is marked in degrees and is intended to be set manually to any desired reading.

The course selector dial 12 is mounted in an instrument panel 13 which is preferably mounted in and supported by the case 1. This panel 13 may also be a separate unit connected to other parts of the device by an electrical cable.

Figure 3:
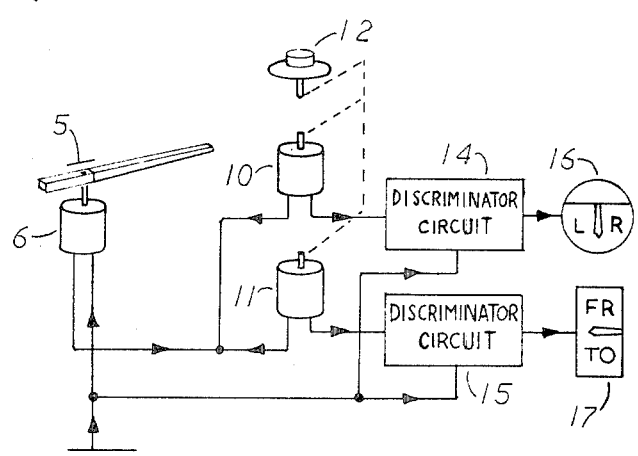
FIG. 3 is a block diagram schematic of the sensing and indication system.

Referring to FIG. 3, the three selsyns 6, 10, 11 are electrically interconnected as in a standard instrument repeater circuit with stator windings in parallel. The rotor of the radial arm selsyn 6 is powered with an AC voltage. The AC signals on the rotors of the course selector selsyns 10, 11 which result from the relative angular positions of the radial arm 5 and the course selector dial 12 are each connected to a discriminator circuit 14, 15 of a type commonly used to compare two AC voltages of varying phase and amplitude. The output of each discriminator circuit 14, 15 is connected to an indicator 16, 17. The indicators 16, 17 are preferably zero centered DC microammeters having a suitable range. One meter 17 serves as a "to-from" indicator and is marked to indicate a "to" reading one side of center and a "from" reading the other side of center. Alternatively, the "to-from" indicator may be any two state indicating device such as a set of two lights operated by a sensitive relay. The second meter 16 serves as a course deviation meter and is marked to indicate deviation from a selected course "left" or "right" of the on-course or center indication.

On assembly of the device, the reactive positions of the radial arm 5, the course selector dial 12 and the three selsyn 6, 10, 11 shafts are so set and the electrical interconnections are so made as to cause the indicators 16, 17 to respond to positioning of the moveable piece 7 and the setting of the course selector dial 12 in a manner and sense consistent with that which would be observed in actual aircraft navigation with reference to an omnirange station. Specifically, the position of the radial arm 5 with respect to its selsyn 6 shaft and the position of the course selector dial 12 with respect to the course deviation selsyn 10 shaft are set so that with the radial arm 5 pointing due north, an on course indication will be presented with the course selector dial 12 set at either 0° or 180°. Under the same conditions the "to-from" selsyn 11 shaft is set so that a full scale "to" indication is presented with the course selector dial 12 at 180° and a full scale "from" indication is presented with the course selector dial 12 set at 0°.

The correct sense of indicator 16, 17 movement with respect to the movement of the piece 7 is achieved by choice of polarity in electrically connecting the selsyn 10, 11 rotor signals to the discriminator circuits 14, 15 or the discriminator circuits 14, 15 to the indicators 16, 17. In this way the sense of the movement of the indicators 16, 17 with respect to the movement of the piece 7 is made to correspond to that accepted as standard for the omnirange navigation system. For example, with the moveable piece 7 and thus the radial arm 5 in one position, the course selector dial 12 may be adjusted to give a center indication on the course deviation meter 16 for two settings, each 180° apart. On one of these settings the "to-from" indicator 17 will show a "to" indication and the course selector dial 12 reading will then represent the magnetic course to the omnirange station 3. On the other setting of the course selector dial 12 the "to-from" indicator 17 will show a "from" indication and the course selector dial 12 reading will represent the magnetic course away from the omnirange station 3. With the course selector dial 12 set to give a centered indication on the course deviation meter 16 and a "to" indication on the "to-from" indicator 17, movement of the piece 7 in a counterclockwise direction about the simulated omnirange station 3 will cause a left of center indication on the course deviation meter 16 and movement clockwise will cause a right of center indication.

In use, the device may be operated by either an instructor or a student and the operation may be observed by others in group instruction.

What is claimed is:

1. A device to demonstrate and teach aircraft navigation with respect to an omnirange station comprising: means for representing a vehicle; nonmagnetic means for supporting said representing means; means for shifting the phase of cyclic reference signal by an amount proportional to the angular position of a shaft; means for controlling said angular position, said control means being physically separated from said representing means by said support means but being magnetically connected to the representing means, said shifted signal being connected to a means for indicating the angular position of said representing means with respect to a simulated omnirange station.

2. A device as set forth in claim 1 wherein the means for controlling the angular position of a shaft is a radial arm attached to said shaft.

* * * * *